US008189681B1

(12) United States Patent
Thiffault et al.

(10) Patent No.: US 8,189,681 B1
(45) Date of Patent: May 29, 2012

(54) DISPLAYING MULTIPLE COMPRESSED VIDEO STREAMS ON DISPLAY DEVICES

(75) Inventors: Alain Thiffault, Sainte-Marthe-sur-le-Lac (CA); François Choquette, Laval (CA); Jonathan Hou, Montréal (CA); Christian Toutant, Montréal (CA)

(73) Assignee: Matrox Graphics Inc., Dorval, Quebec (CA)

( * ) Notice: Subject to any disclaimer, the term of this patent is extended or adjusted under 35 U.S.C. 154(b) by 881 days.

(21) Appl. No.: 12/237,373

(22) Filed: Sep. 24, 2008

(51) Int. Cl.
*H04N 7/12* (2006.01)
(52) U.S. Cl. ............... 375/240.25; 375/240.26; 380/217
(58) Field of Classification Search .............. 375/240.25
See application file for complete search history.

(56) References Cited

U.S. PATENT DOCUMENTS

| | | | |
|---|---|---|---|
| 4,852,129 A * | 7/1989 | Schwartz ..................... | 375/240 |
| 5,191,645 A | 3/1993 | Carlucci et al. | |
| 5,275,327 A | 1/1994 | Watkins et al. | |
| 5,572,232 A * | 11/1996 | Rhodes et al. ............. | 345/581 |
| 5,621,428 A | 4/1997 | King et al. | |
| 6,441,841 B1 * | 8/2002 | Tanoi ........................ | 348/14.07 |
| 6,573,905 B1 | 6/2003 | MacInnis et al. | |
| 6,919,892 B1 | 7/2005 | Cheiky et al. | |
| 7,027,054 B1 | 4/2006 | Cheiky et al. | |
| 7,356,051 B2 | 4/2008 | Pasqualino et al. | |
| 7,405,738 B2 | 7/2008 | Mance et al. | |
| 2002/0163598 A1 | 11/2002 | Pasqualino | |
| 2007/0076123 A1 | 4/2007 | Ogilvie | |
| 2007/0133692 A1 | 6/2007 | Reddy et al. | |
| 2007/0297501 A1 | 12/2007 | Hussain et al. | |
| 2008/0060034 A1 | 3/2008 | Egnal et al. | |
| 2008/0094487 A1 * | 4/2008 | Tojima ...................... | 348/231.99 |
| 2008/0158233 A1 | 7/2008 | Shah et al. | |
| 2008/0284763 A1 * | 11/2008 | Someya et al. .............. | 345/204 |

FOREIGN PATENT DOCUMENTS

WO     WO03058826     7/2003

* cited by examiner

*Primary Examiner* — Longbit Chai
(74) *Attorney, Agent, or Firm* — Norton Rose Canada LLP

(57) ABSTRACT

A method and display system for displaying compressed video streams from a plurality of video sources. The display system comprises an input module for decompressing a compressed video stream in an intermediate data format, an intermediate module for receiving the video stream in the intermediate data format incompatible with a display device, and an output module for converting the video stream in the intermediate format into a final data format to be displayed on the display device.

23 Claims, 9 Drawing Sheets

DISPLAYING MULTIPLE COMPRESSED VIDEO STREAMS ON DISPLAY DEVICES

CROSS-REFERENCE TO RELATED APPLICATIONS

This is the first application filed for the present invention.

TECHNICAL FIELD

The present invention relates to the field of video streaming from multiple sources to multiple displays.

BACKGROUND

Display systems can display video and graphics from a variety of data sources (e.g. analog or digital cameras), some of which continuously send network data or IP streams. The variety of incoming streams may be combined and displayed on multiple windows on a single display device (e.g. LCD monitor). Multiple windows may be displayed on multiple display devices. A single window can also be split across multiple display devices.

The traditional way display systems process incoming video streams can comprise of three processing routines on a host device. A first processing routine captures and parses network incoming streams, a second processing routine decodes the network data and a third processing routine renders incoming streams from the variety of data sources. The host device can be, for example, a PC or another display system.

Alternatively, this processing can be done externally to the host and once rendered, the streams are sent to the host device. In this case, the number of incoming streams is limited due to bandwidth consumption during data exchanges between a remote processor and the host device. When transmitting a fully rendered image, the size and resolution of the image will limit the number of streams that can be sent to a display device. Additionally, the processor on the host device limits the number of streams that can be displayed on a display system. Therefore, there is a need to address these issues to provide bandwidth availability and processing performance for a large amount of incoming video streams.

SUMMARY

It is a broad aspect of an embodiment of the present invention to provide a method for displaying at least one compressed video stream from at least one video source on at least one display device, the method comprising: receiving the at least one compressed video stream from the at least one video source; decompressing the at least one compressed video stream to provide at least one frame in an intermediate data format; transmitting the at least one frame in the intermediate data format; receiving the at least one frame in the intermediate data format; converting the at least one frame in the intermediate data format into a final data format compatible with the at least one display device; and displaying the at least one frame in the final data format on the at least one display device.

It is another broad aspect of an embodiment of the present invention to provide an input module for decompressing at least one compressed video stream from at least one video source for display on at least one display device, the input module comprising: a General Purpose Processor (GPP) configured to decompress the at least one compressed video stream to provide at least one frame in an intermediate data format; and a Graphics Processing Unit (GPU) configured to transmit the at least one frame in the intermediate data format to a display apparatus, the intermediate data format being incompatible with the at least one display device.

It is another broad aspect of an embodiment of the present invention to provide a display apparatus for displaying a plurality compressed video streams from a plurality of video sources, the display apparatus comprising: an intermediate module adapted to receive at least one frame in an intermediate data format and send the at least one frame in the intermediate data format; an output module adapted to receive the at least one frame in the intermediate data format, convert the at least one frame in the intermediate data format into a final data format compatible with at least one display device, and display the at least one frame in the final data format on the at least one display device; and a Central Processing Unit (CPU) for controlling said display apparatus, and having an interface bus for communicating with the intermediate module and the output module.

It is another broad aspect of an embodiment of the present invention to provide a display system for displaying at least one compressed video stream from at least one video source on at least one display device, the display system comprising: an input module for decompressing at least one compressed video stream from at least one video source for display on at least one display device, the input module comprising: a General Purpose Processor (GPP) configured to decompress the at least one compressed video stream to provide at least one frame in an intermediate data format; and a Graphics Processing Unit (GPU) configured to transmit the at least one frame in the intermediate data format, the intermediate data format being incompatible with the at least one display device; and a display apparatus adapted to receive the at least one frame in the intermediate data format, convert the at least one frame in the intermediate data format into a final data format compatible with the at least one display device, and display the at least one frame in the final data format on the at least one display device.

BRIEF DESCRIPTION OF THE DRAWINGS

Further features and advantages of the present invention will become apparent from the following detailed description, taken in combination with the appended drawings, in which.

DETAILED DESCRIPTION

While illustrated in the block diagrams as groups of discrete components communicating with each other via distinct data signal connections, it will be understood by those skilled in the art that some embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

There is described herewith a system which allows video and graphics data from a variety of sources (e.g., external analog or digital cameras, DVD player, RGB/DVI output of an auxiliary PC/laptop, etc.) to be combined into a single desktop. The system also allows a single desktop image to be split across multiple display devices (e.g., LCD monitors). Display wall systems may be used for decompressing and displaying compressed video streams received from a large number of network IP devices and comprise features such as simultaneously decompressing diverse video streams, using different frame rates/resolutions, using different camera manufacturers/models, using different transport standards, using non-standard transport schemes, using different encoding standards (e.g., MPEG-1, MPEG-2, etc.), and using non-standard encoding schemes.

The display system described herein decouples the decompressing and rendering steps of the processing of incoming video streams in order to produce a decompressed video frame displayed on a display device. An unrendered but decompressed video frame can therefore be transmitted using lower bandwidth than a fully rendered image.

Figure 1:
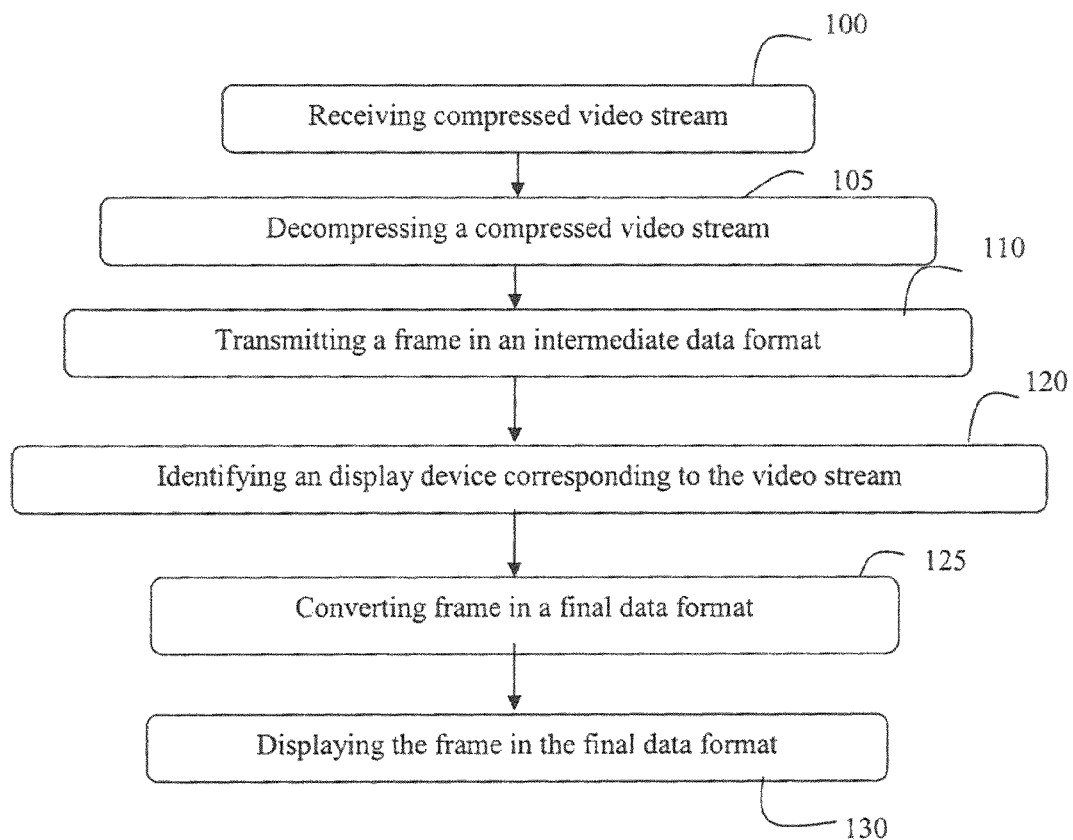
FIG. 1 is a flow chart of a method for displaying compressed video streams from a plurality of video sources, on a plurality of display devices of a display apparatus in accordance with an embodiment of the invention.

Reference is now made to FIG. 1, which illustrates a flow chart of a method for displaying a plurality of compressed video streams from a plurality of video sources, on a plurality of display devices of a display apparatus in accordance with an embodiment of the invention.

At step 100, a compressed video stream is received from a video source. The compressed video stream is then parsed and decompressed to provide a frame in an intermediate data format (step 105). The frame is stored in a first memory. The first memory is accessed a copy of the decompressed video frame is made to a second memory. The decompressed video frame in the second memory is then formatted. The formatting involves at least in part fitting the decompressed video frame into a section allotted to that given video stream for transmission, as will be explained in more detail below. Multiple decompressed video frames are combined in a single frame and transmitted together, each associated with a compressed video stream.

Each transmitted frame includes information in a header in order to indicate the presence of new or old data. Every time a transmission frame is prepared, the header will indicate whether the data in the transmission frame is new by setting a bit corresponding to new data availability equal to "one", otherwise the bit remains equal to "zero".

Following the decompressing step, the decompressed frames are transmitted in the intermediate data format and received on the display apparatus (step 110). It may be possible that the decompressed frame data that is transmitted is not the full decompressed frame data corresponding to the video stream, but only a portion of a full decompressed video frame from the video stream. In another case, the decompressed video frame may correspond to at least two partial frames and all of the partial frames are transmitted, either in a single transmission surface or multiple transmission surfaces. For each received transmission frame, the header of the transmission frame is read and decompressed video frame are extracted. A given output device corresponding to the at least one compressed video stream is identified. Each output device has a corresponding Graphics Processing Unit (GPU) associated thereto.

Each extracted decompressed frame is then sent to the appropriate GPU. The decompressed frame is then converted from the intermediate data format into a final data format compatible with the corresponding display device (step 125). The decompressed frame is then displayed on the display device in the final data format (step 130).

In order to save bandwidth and unnecessary data processing, the data size of the intermediate data format is smaller then the data size of the final data format. The data is transmitted over a cable to the display apparatus having been partially processed, but not yet converted from the intermediate data format to the final data format. The data conversion from an intermediate data format to a final data format and bandwidth saving allows the display system to display a larger number of video streams from at least one video source. In another embodiment, a plurality of compressed video streams from a plurality of video sources may be decoded simultaneously, in multiple formats. Each compressed video stream is independent and can be associated to a video source. This results in transmission of a decompressed video frames in parallel to a plurality of other decompressed video frames. The decompressed video frames are combined in one frame. Thus, all decompressed video frames are combined as one large frame of video information. The assembled frame in the intermediate data format is then sent out in the intermediate data format to the display apparatus. Then the assembled frame is divided before being displayed on the display device.

Figure 2:
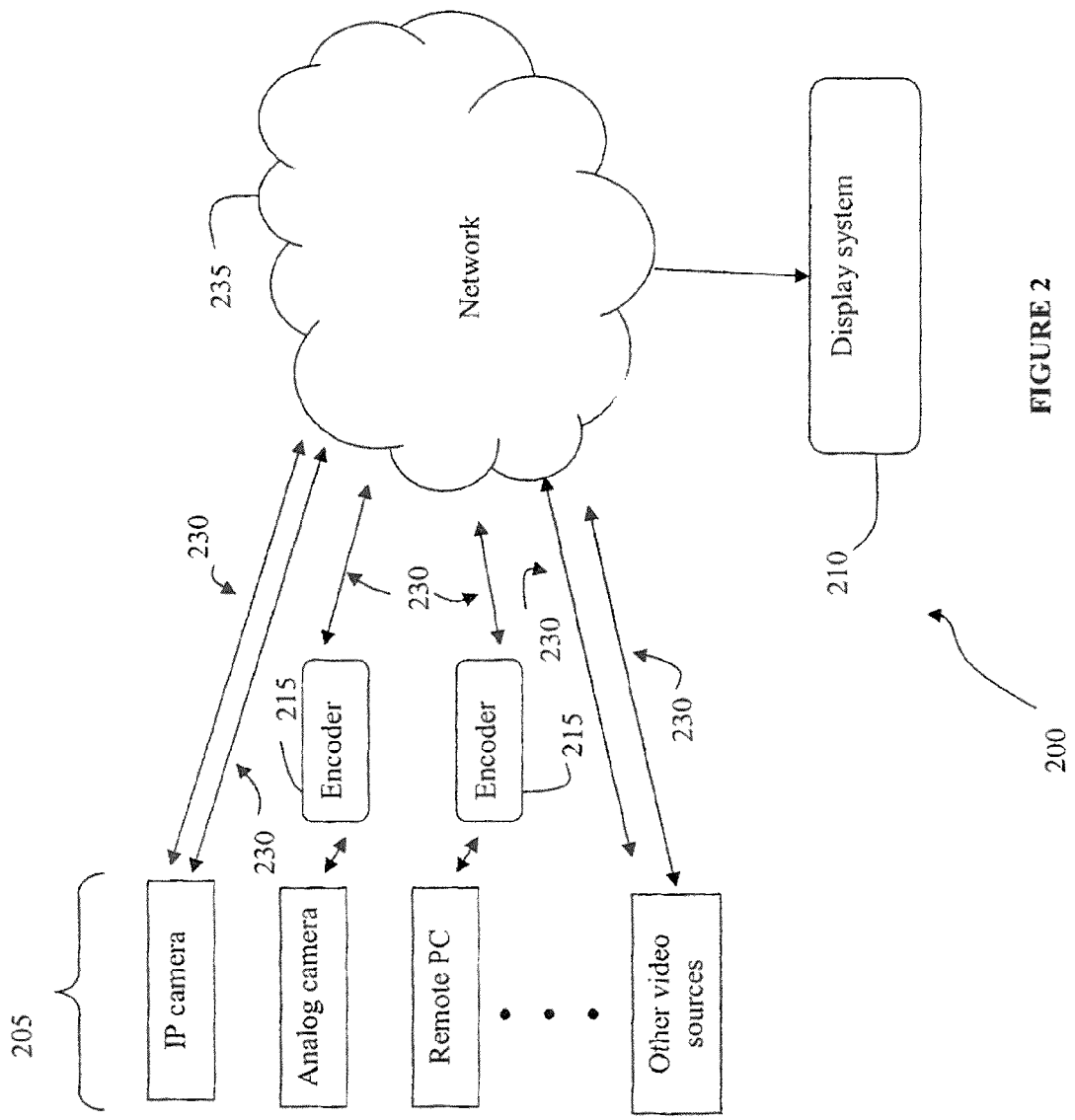
FIG. 2 is a diagram of a data network in accordance with an embodiment of the invention.

Reference is now made to FIG. 2, which illustrates a diagram of a data network 200 in accordance with an embodiment of the invention. The data network 200 comprises various video sources 205. A video source can be, for example, a camera, a Personal Computer (PC), a DVD player, etc. The data network 200 can be, for example, any monitoring or surveillance system. A video source may be connected to an encoder 215 for encoding analog video streams into digital video streams. The compressed video streams 230 may be sent to a display system 210 or via a network 235 such as the Internet, a Local Area Network (LAN), a Wide Area Network (WAN), etc. The compressed streams are displayed on display devices of the display system 210.

Figure 3:
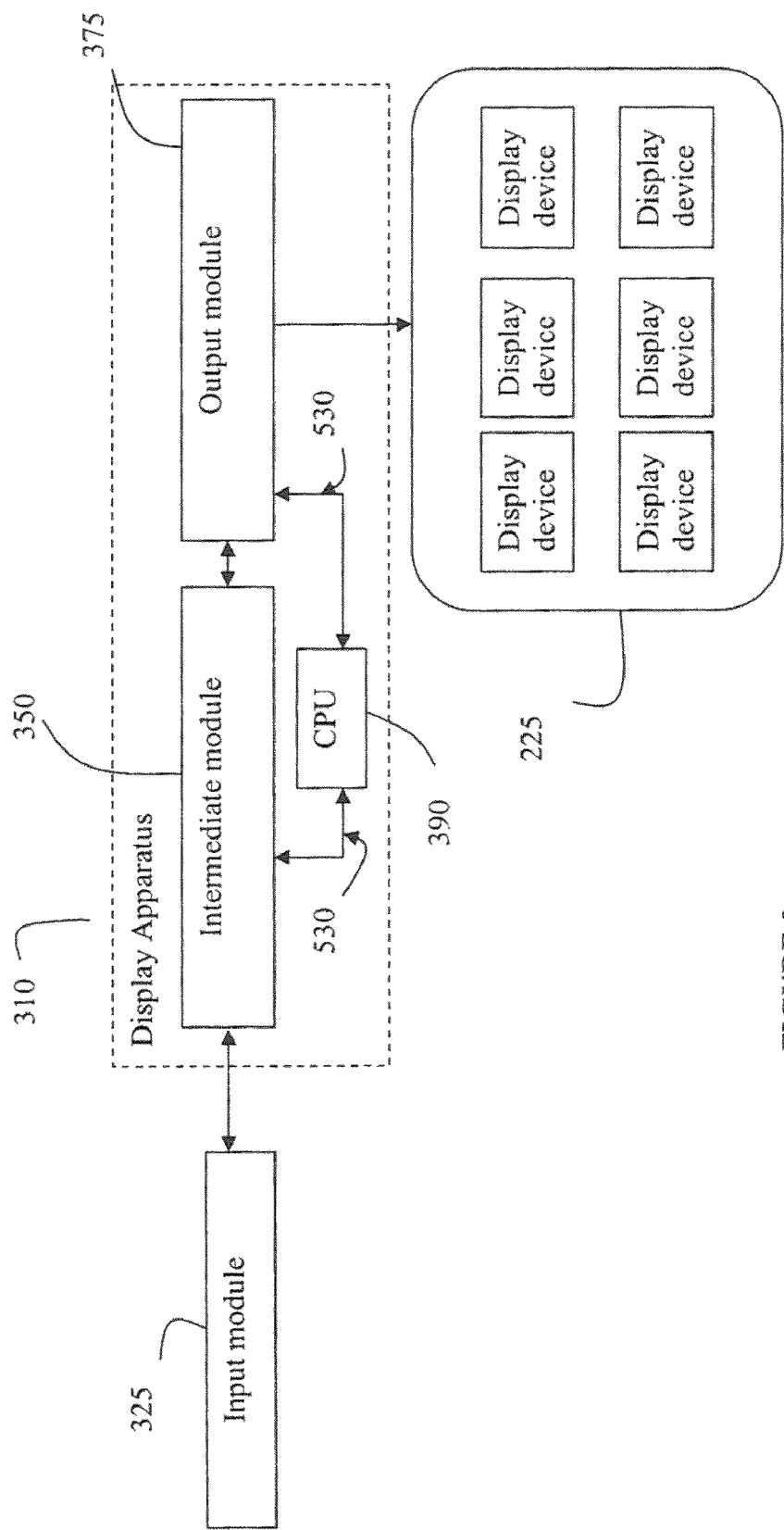
FIG. 3 is a diagram of a display system in accordance with an embodiment of the invention.

Reference is now made to FIG. 3, which illustrates the display system 210 in accordance with an embodiment of the invention. The display system 210 comprises an input module 325, in communication with an intermediate module 350 of a display apparatus 310. The display apparatus 310 also comprises an output module 375. The display apparatus 310 is further connected to display devices 225 for displaying video streams 230 received from video sources 205. In one embodiment the display apparatus 310 may be a personal computer (PC) such as a desktop computer, a rack-mount computer, etc. In another embodiment the display apparatus may physically include the input module 325, the intermediate module 350 and the output module 375, but the input module 325 remains electrically isolated from other elements of the display apparatus 310, such as a central processing unit, and can only communicate directly with the intermediate module 350. In yet another embodiment, the intermediate module 350 and the output module 375 are combined into a single module in the display apparatus 310.

In one embodiment, the input module 325 is in communication with the intermediate module 350 via a physical connection such as a Digital Visual Interface (DVI) link or another connection capable of transmitting data in various data formats such as, for example YUV data format or RGB data format. DVI is a video interface standard designed to maximize the visual quality of digital display devices. It carries uncompressed digital video data to a display. RGB is an additive color model, where you add a percentage of Red, Green, or Blue to reproduce an array of colors. YUV is a color space that defines color in terms of one luma and two chrominance components.

In another embodiment, the intermediate module 350 and the output module 375 are in electronic communication with a Central Processing Unit (CPU) 390 via an interface 530, which may be an interface bus, or any other type of connection means known to a person skilled in the art. In one embodiment the CPU 390 is a description of a class of logic machines that can execute computer program, such as a processor in an Intel x86 architecture. In another embodiment, the CPU 390 controls the display apparatus 210. The intermediate module 350 and the output module 375 may exchange data through the interface 530 or alternatively through an interface 545 such as an over-the-top interface isolated from the interface 530. The intermediate module 350 and the output module 375 may be embodied in a graphics card or board, as is typically known to a person skilled in the art, or may be provided as another combination of software and hardware components such that they may communicate with the display apparatus on which they reside.

Figure 4A:
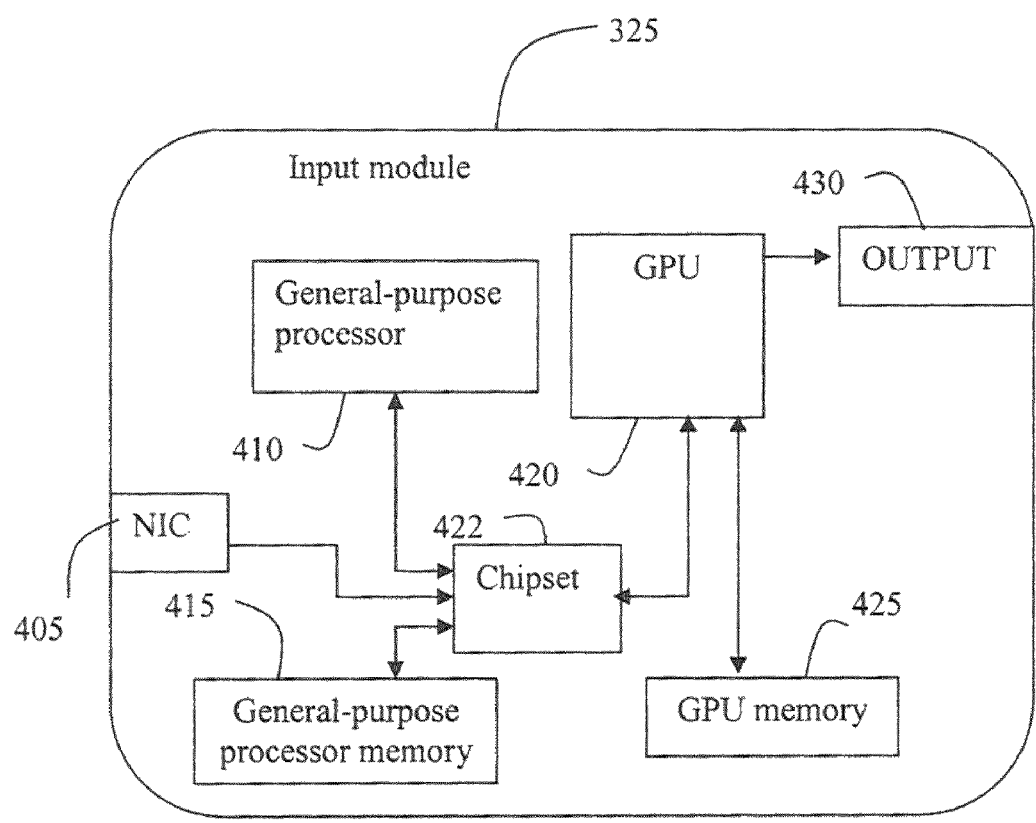
FIG. 4A is a diagram of a input module in accordance with an embodiment of the invention.

Reference is now made to FIG. 4A, which is a diagram of the input module 325 in accordance with an embodiment of the invention. The input module 325 comprises Network Interface Controller 405 for receiving compressed video streams, a general-purpose processor 410 for processing the compressed video streams and for storing video frame data in a general-purpose processor memory 415. In one embodiment, the general-purpose logic can be any general-purpose logic machine capable of executing a sequence of instructions or code of a computer program stored in a memory element. For example, the GPP may have an x86 instruction set architecture or another instruction set architecture providing a similar functionality. In another example, the GPP may be capable of running an operating system.

In one embodiment, the general-purpose processor 410 may support multiple threads of execution. In another embodiment, the general-purpose processor may have multiple processing cores providing further concurrent processing functionality. In yet another embodiment, the general-purpose processor 410 may serve as the Central Processing Unit (CPU) of the input module 325. Alternatively, the input module 325 may have a separate processor (not shown) serving as the CPU.

Figure 4B:
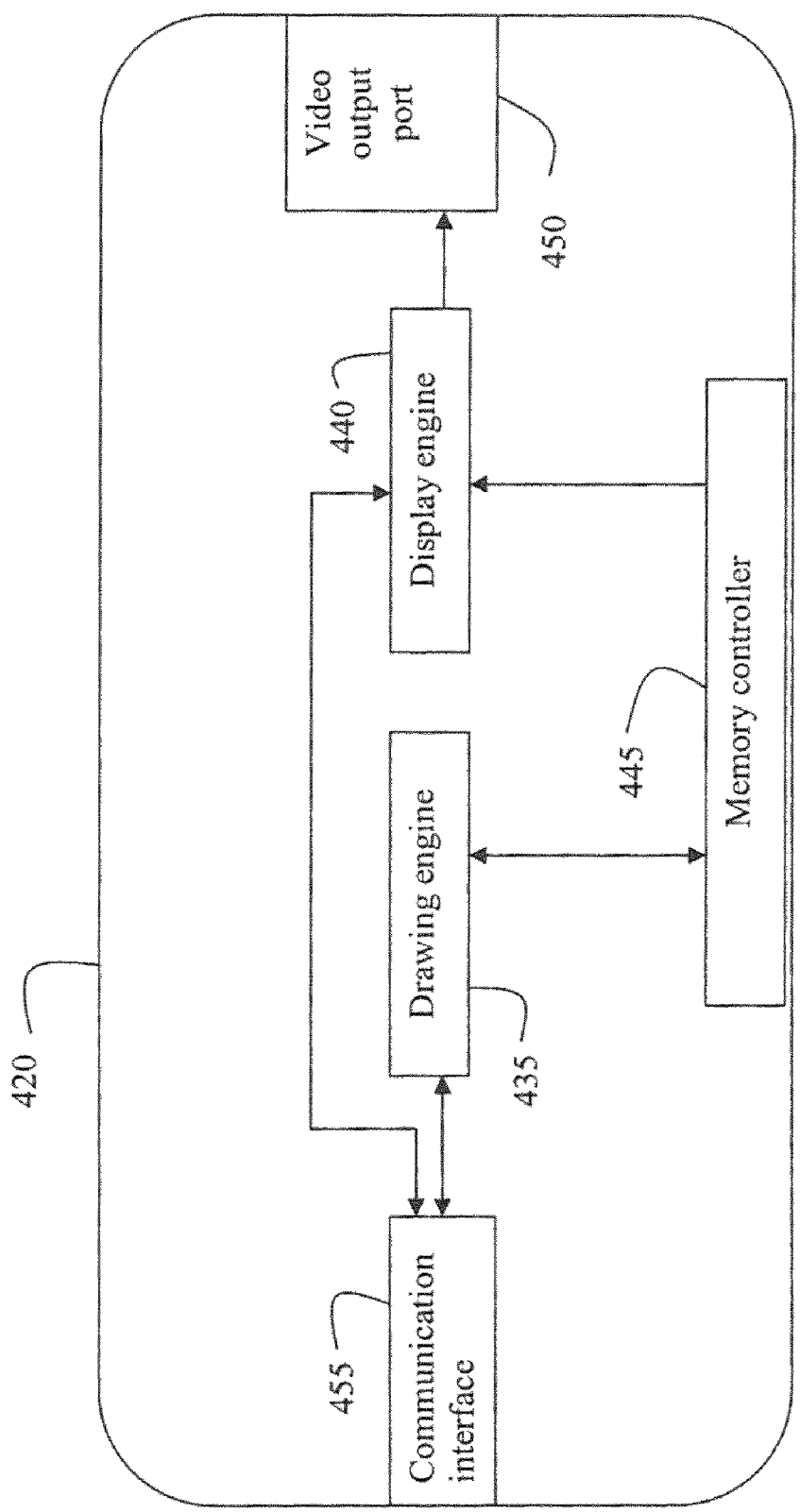
FIG. 4B is a diagram of a Graphics Processing Unit (GPU) in accordance with an embodiment of the invention.

The input module 325 further comprises a GPU 420, which is a dedicated graphics processor to transmit the frame in the intermediate data format to a display apparatus. Reference is now made to FIG. 4B, which is a diagram of the GPU 420 in accordance with an embodiment of the invention. The GPU 420 comprises a drawing engine 435 that accesses a general-purpose processor memory 415 for creating the frame in the intermediate data format in the GPU memory 425, based on instructions received from the general-purpose processor 410. The GPU further comprises a display engine 440 for reading the frame in the intermediate data format from GPU memory 425, and outputting the frame to video output port 450. The GPU 420 further comprises a memory controller 445 connected to the drawing engine 435 and the display engine 440 enabling the drawing engine 435 and the display engine 440 to read from and write to the GPU memory 425. The video output port 450 sends output data from the GPU 420 in an intermediate format or a format compatible with a display device 225. The GPU 420 also comprises a communication interface 455 for communicating data with components external to the GPU 420 such as the chipset 422, the general-purpose processor 410, a CPU (not shown), a general-purpose processor memory 415, etc.

The input module 325 receives a compressed video stream from one of the video sources 205. The general-purpose processor 410 then stores the compressed video stream data in the general-purpose processor memory 415. The general-purpose processor 410 is adapted to decompress any compressed video streams such as streams received from network 235. In one embodiment, the general-purpose processor 410 decompresses the compressed video stream 230 using a decompression routine. In another embodiment, the decompression routine can be broken down into decompression sub-routines that may be accelerated by another processing element, such as a GPU similar as the GPU 420. In some cases, it is possible that the video stream be decompressed into two or more partial frames. The GPU 420 will then transmit the multiple partial frames.

In another embodiment, the input module 325 can simultaneously decompress a plurality of incoming compressed video streams. Furthermore, since the data network 200 may have different video sources 205 such as, for example different types of cameras or encoders, the input module 325 can decompress video streams with different codecs such as MPEG-2, MPEG-4, etc. Each compressed video stream 230 is independent and can be associated with different video sources 205. Alternatively, multiple independent compressed video streams 230 can be associated with a single video source.

After decompressing the compressed video stream, the general-purpose processor 410 copies a decompressed video frame into a destination buffer in the general-purpose processor memory 415 that is pre-assigned to the video stream. The GPU 420 accesses the destination buffer in the general-purpose processor memory 415 via the chipset 422, and copies the decompressed video frame into the GPU memory 425 corresponding to a transmission surface. The chipset 422 can be, for example, a group of integrated circuits that are designed to work together.

Figure 7:
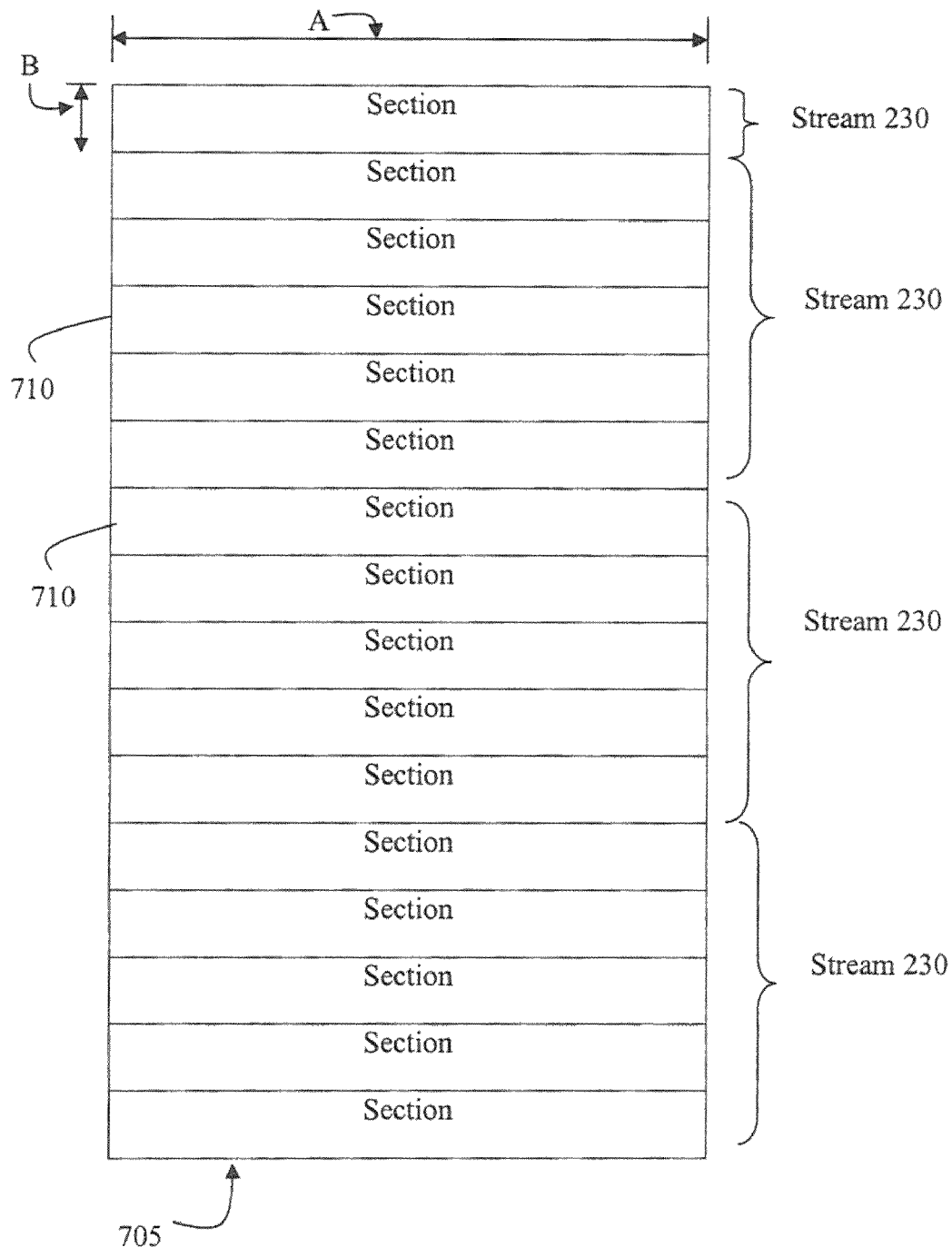
FIG. 7 is a memory transmission surface of decompressed frames in accordance with an embodiment of the invention.
Figures 8A, 8B:
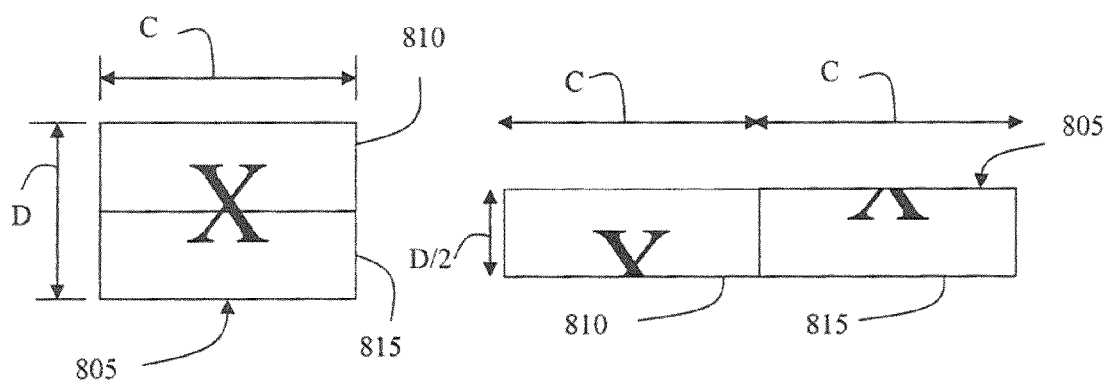
FIGS. 8A and 8B are diagrams of a decompressed frame of an image in accordance with an embodiment of the invention.

The GPU 420 may further format the decompressed video frame to maximize the space allotted to the video stream 230 in the transmission surface. Reference is now made to FIG. 7, which represents a transmission surface that combines decompressed frames from multiple video streams 230 in accordance with an embodiment of the invention. According to an embodiment, the transmission surface 705 can be divided into multiple sections 710, each section 710 with maximum size of A×B pixels and destined for receiving a decompressed video frame associated with a particular video stream 230. In one embodiment, a decompressed video frame is split up into smaller pieces to fit within the dimensions A×B of section 710. Reference is now made to FIGS. 8A, which represents a decompressed frame 805 of a video stream 230 in accordance with an embodiment of the invention. For example, a decompressed frame 805 with dimensions of C×D pixels will be split into two parts: an upper half 810 and lower half 805 respectively of C×D/2 pixels, to maximize the number of pixels available horizontally and to fit within the number of lines available vertically in a section 710.

In FIG. 8B, the upper half 810 of the decompressed frame 805 in the destination buffer in general-purpose processor memory 415 is transferred directly into a left portion of a section 710 in the transmission surface 705. The lower half 815 of the decompressed frame 805 in the destination buffer is transferred directly into a right portion of the section 710 in the transmission surface 705. In another embodiment, the decompressed frame 805 may be formatted in any number of ways to fit within a section 710 of the transmission surface 705. For example, a decompressed frame 805 can be split into four parts instead of two.

In yet another embodiment, multiple sections 710 may be grouped together to support a larger decompressed frame 805 from a higher resolution video stream 230. For example, all sections 710 in transmission surface 705 may be combined as one large section to transfer a very large decompressed frame 805. In another embodiment, the transmission surface 705 may be divided into sections 710 having differing dimensions. The GPU 420 further combines the decompressed frames 805 from remaining video streams 230 together into the transmission surface 705 in its memory 425. The transmission surface 705 may include a header to indicate the presence of new and old decompressed frames 805. The transmission surface is updated at a predefined rate such as 60 Hz. The video sources may not be synchronized to this rate. Every time a transmission surface 705 is updated, the header will indicate whether the decompressed frame 805 in its corresponding section 710 is new or old.

The transmission surface 705 is in an intermediate data format and is sent out by the GPU 420 via the output unit 430 to the intermediate module 350. The transmission surface 705 is in an intermediate format incompatible with an intended display device 225.

Figure 5:
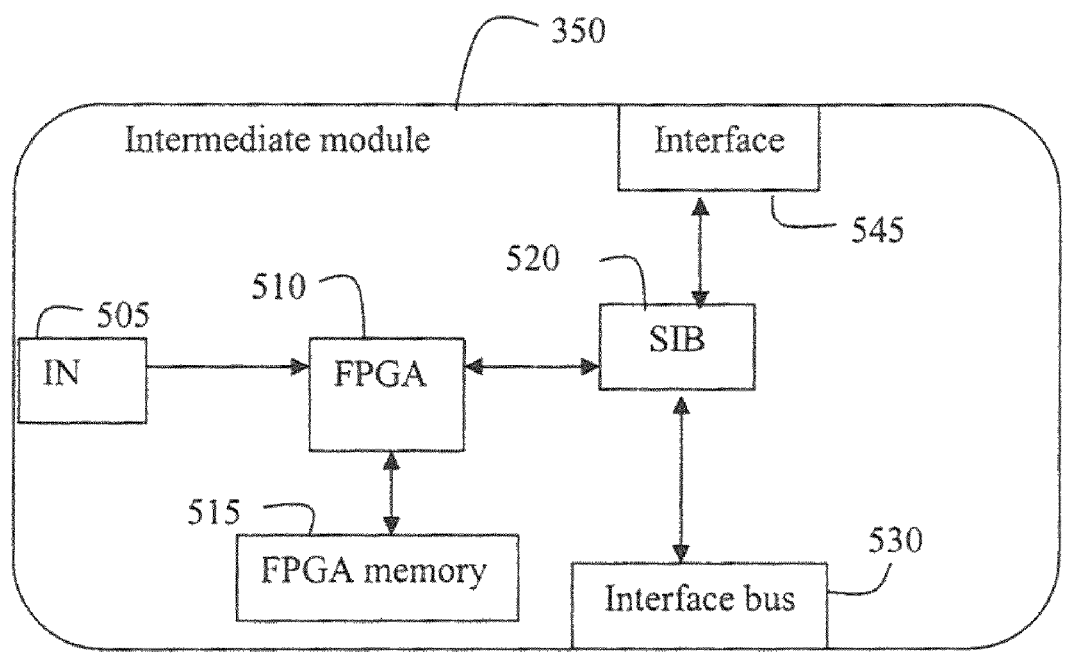
FIG. 5 is a diagram of an intermediate module in accordance with an embodiment of the invention.

Reference is now made to FIG. 5, which is a diagram of the intermediate module 350 in accordance with an embodiment of the invention. The intermediate module 350 comprises an input unit 505 adapted to receive a transmission surface 705 in the intermediate format from the input module 325. The intermediate module 350 further comprises a Field Programmable Gate Array (FPGA) chip 510. In one embodiment, the FPGA can be, for example, a semiconductor device containing programmable logic blocks. In another embodiment, the FPGA is a type processing unit. Under instructions of an application running on the CPU 390 of the display apparatus 310, the FPGA chip 510 extracts the section 710 from the transmission surface 705 associated with a video stream 230. Under instructions of an application running on the CPU 390, the FPGA chip 510 sends via System Interface Bridge (SIB) 520 the extracted section in the intermediate data format to a given output module 375 connected to a display device 225 on which the video stream 230 is to be displayed. The SIB 520 can be, for example, a communication routing device, a semiconductor, etc.

Figure 6:
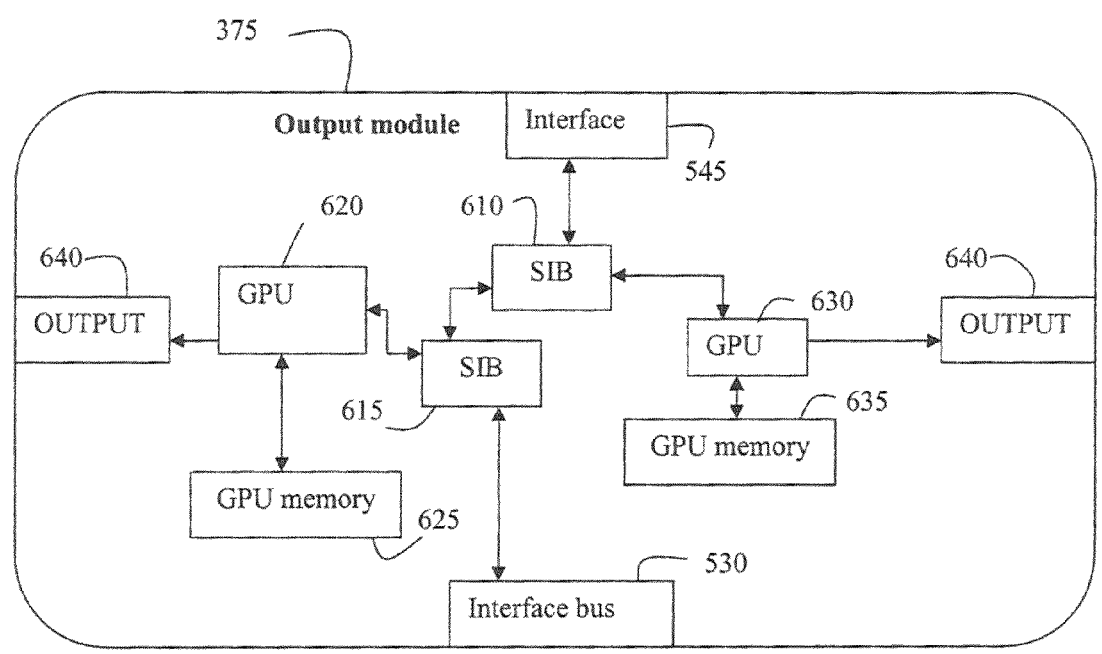
FIG. 6 is a diagram of an output module in accordance with an embodiment of the invention.

Reference is now made to FIG. 6, which is a diagram of the output module 375 in accordance with an embodiment of the invention. The output module 375 comprises an interface 545 for receiving the extracted section in the intermediate data format. The output module 375 then converts the extracted section in the intermediate data format into a final data format.

When receiving an extracted section 710 for a video stream 230 in the intermediate format, the GPU (620 or 630) on the output module 375 converts in its corresponding GPU memory (625 or 635) the extracted section 710 from the intermediate data format into a final data format compatible with a display device 225 associated with the GPU (620 or 630). In addition, referring back to FIGS. 8a and 8b, the decompressed video frame 805 is reconstructed from its upper half 810 and lower half 815 in the extracted section 710.

In another embodiment, a GPU (620 or 630) is associated with a set of display devices 225. The frame is then displayed in the final data format on at least one of the associated display devices 225.

In another embodiment, the output module 375 can allow pixel operations such as upscaling, downscaling, and cropping of the decompressed frames 805.

In another embodiment, the intermediate module 350 and the output module 375 may be associated to more than one input module 325 to increase the number of compressed video streams to be displayed on the display system 210.

In yet another embodiment, the general-purpose processor memory 415, the FPGA memory 550, the GPU memory 425, the GPU memory 625 and the GPU memory 635 are any hardware capable of storing data or any database, such as a Structured Query Language (SQL) persistent writable memory such as a Random Access Memory (RAM), an Erasable Programmable Read-Only Memory (EPROM), etc.

In order to save bandwidth and unnecessary data processing, the data size of the intermediate data format should be smaller then the data size of the final data format. The data conversion from an intermediate data format to a final data format and bandwidth saving allows the display system 210 to display a larger number of video streams 230 from video sources 205.

In one embodiment, the intermediate data format can be a YUV data format, such as but not limited to YUYV or UYVY and the final data format can be an RGB data format such as but not limited to RGB16, RGB24 or RGB32. Whereas, displayed data is usually in an RGB data format for computer displays, the transmission surface of the GPU 420 can be in a non-conventional data format such as YUV. This maximizes bandwidth and avoids unnecessary processing required from the general-purpose processor of an input module, the GPU of an output module, and the CPU of the display apparatus to perform a conversion from YUV to RGB.

Those skilled in the art will understand that the data network 200 is not limited to the number of elements shown on the Figures. For example, the data network 200 may comprise more than the number of video sources and comprise a display apparatus having more than the number of input modules, intermediate modules, and output modules on the Figures. In one embodiment, the total number of display devices will dictate how many GPUs are needed to convert the data from an intermediate format to a final format, which will in term determine the number of output boards needed. In one example, four display devices can be handled by one GPU, and two GPUs are present on each output board.

Those skilled in the art will also understand that some messages and parameters transmitted between the network elements of the data network 200 are not mentioned nor described for clarity reasons. Some messages and parameters sent between network elements in the data network 200 are also omitted for clarity reasons. More particularly, it should also be understood that FIG. 2 depicts a simplified data network 200, and that many other network elements have been omitted for clarity reasons only. The embodiments of the invention described above are intended to be exemplary only. The scope of the invention is therefore intended to be limited solely by the scope of the appended claims.

The invention claimed is:

1. A method for displaying a plurality of compressed video streams from at least one video source on at least one display device, the method comprising:
   receiving a plurality of independently compressed video streams from the at least one video source;
   decompressing the independently compressed video streams into a plurality of independent decompressed frames in an intermediate data format;
   combining the plurality of independent decompressed frames in the intermediate data format into a single assembled frame;
   transmitting the single assembled frame in the intermediate data format;
   receiving the single assembled frame in the intermediate data format;
   extracting the plurality of independent frames in the intermediate format from the single assembled frame;
   converting the plurality of independent frames in the intermediate data format into a final data format compatible with the at least one display device; and
   displaying the plurality of frames in the final data format on the at least one display device.

2. The method of claim 1, wherein the receiving the single assembled frame comprises receiving the single assembled frame in the intermediate data format in an intermediate module, and further comprising transmitting the plurality of independent frames in the intermediate data format extracted from the single assembled frame to at least one output module, the at least one output module being adapted for the converting.

3. The method of claim 1, wherein the receiving a plurality of independently compressed video streams from at least one video source comprises receiving at least one Internet Protocol (IP) stream.

4. The method of claim 1, wherein the transmitting comprises transmitting the single assembled frame in a YUV data format.

5. The method of claim 1, wherein the converting comprises converting the plurality of independent frames from the intermediate data format into an RGB data format.

6. The method of claim 1, wherein the decompressing comprises decompressing at least one of the independently compressed video streams into at least two partial frames, and the transmitting comprises transmitting the single assembled frame formed from the at least two partial frames in the intermediate data format.

7. An input module for decompressing a plurality of compressed video streams from at least one video source for display on at least one display device, the input module comprising:
   a General Purpose Processor (GPP) configured to receive a plurality of independently compressed video streams from the at least one video source, decompress the independently compressed video streams into a plurality of independent decompressed frames in an intermediate data format; and
   a Graphics Processing Unit (GPU) configured to combine the plurality of independent decompressed frames in the intermediate data format into a single assembled frame, and transmit the single assembled frame in the intermediate data format to a display apparatus, the intermediate data format being incompatible with the at least one display device.

8. The input module of claim 7, wherein the GPP stores the plurality of independent decompressed frames in an intermediate data format in a first memory, and the GPU accesses the first memory for copying the plurality of independent decompressed frames in the intermediate data format, to provide the single assembled frame in a second memory.

9. The input module of claim 7, wherein the independently compressed video streams are Internet Protocol (IP) streams.

10. The input module of claim 7, wherein the intermediate data format is a YUV data format.

11. The input module of claim 8, wherein the GPU maximizes a space allotted to the plurality of independent decompressed frames when copying the plurality of decompressed frames.

12. The input module of claim 7, wherein the single assembled frame comprises a header to indicate the presence of new and old frame data.

13. The input module of claim 7, wherein the GPP is configured to decompress at least one of the plurality of independently compressed video streams into at least two partial frames, and the GPU is configured to transmit the at least two partial frames in the single assembled frame.

14. A display apparatus for displaying a plurality of independent decompressed video streams from a plurality of video sources, the display apparatus comprising:
   an intermediate module adapted to receive a single assembled frame in an intermediate data format, extract from the single assembled frame the plurality of independent decompressed frames in the intermediate data format, and send the plurality of independent frames in the intermediate data format;
   an output module adapted to receive the plurality of independent decompressed frames in the intermediate data format, convert each of the plurality of independent decompressed frames into a corresponding final data format compatible with at least one display device, and display each of the plurality of independent frames in its corresponding final data format on the at least one display device; and
   a Central Processing Unit (CPU) for controlling said display apparatus, and having an interface bus for communicating with the intermediate module and the output module.

15. The display apparatus of claim 14, wherein the intermediate module is adapted to extract the plurality of independent frames from the single assembled frame as at least two partial frames.

16. The display apparatus of claim 15, wherein the output module is adapted to convert the at least two partial frames into a same final data format and display the at least two partial frames on the at least one display device within a single frame.

17. The display apparatus of claim 14, wherein the intermediate data format is a YUV data format.

18. The display apparatus of claim 14, wherein the final data format is an RGB data format.

19. A display system for displaying a plurality of compressed video streams from at least one video source on at least one display device, the display system comprising:
   an input module for decompressing a plurality of independently compressed video streams from at least one video source for display on at least one display device, the input module comprising:
      a General Purpose Processor (GPP) configured to receive a plurality of independently compressed video streams from the at least one video source, decompress the independently compressed video streams into a plurality of independent decompressed frames in an intermediate data format; and a Graphics Processing Unit (GPU) configured to combine the plurality of independent decompressed frames into a single assembled frame in the intermediate data format, and transmit the single assembled frame in the intermediate data format, the intermediate data format being incompatible with the at least one display device; and a display apparatus adapted to receive the single assembled frame in the intermediate data format, extract the plurality of independent decompressed frames in the intermediate format from the single assembled frame, convert each of the plurality of independent decompressed frames in the intermediate data format into a corresponding final data format compatible with the at least one display device, and display each of the plurality of independent decompressed frames in its corresponding final data format on the at least one display device.

20. A display system as in claim 19, wherein the display apparatus comprises:

an intermediate module adapted to receive the single assembled frame in the intermediate data format, extract the plurality of independent decompressed frames in the intermediate format from the single assembled frame and send the plurality of independent decompressed frames in the intermediate data format;

an output module adapted to receive the plurality of independent decompressed frames in the intermediate data format, convert each of the plurality of independent decompressed frames in the intermediate data format into a corresponding final data format compatible with at least one display device, and display each of the plurality of independent decompressed frames in its corresponding final data format on the at least one display device; and a Central Processing Unit (CPU) for controlling said display apparatus, and having an interface bus for communicating with the intermediate module and the output module.

21. The display system of claim 19, wherein the intermediate data format is a YUV data format.

22. The display system of claim 19, wherein the final data format is an RGB data format.

23. The display system of claim 19, wherein the GPP is configured to decompress the independently compressed video streams into at least two partial frames, and the GPU is configured to combine the at least two partial frames in the intermediate format into the single assembled frame.

* * * * *

UNITED STATES PATENT AND TRADEMARK OFFICE
CERTIFICATE OF CORRECTION

| | | |
|---|---|---|
| PATENT NO. | : 8,189,681 B1 | Page 1 of 1 |
| APPLICATION NO. | : 12/237373 | |
| DATED | : May 29, 2012 | |
| INVENTOR(S) | : Alain Thiffault et al. | |

It is certified that error appears in the above-identified patent and that said Letters Patent is hereby corrected as shown below:

Figure 1, Ref. 120, "Identifying an display device [...]" should read "Identifying a display device [...]"

Column 2, Line 8, "[...] a plurality compressed video streams [...]" should read "[...] a plurality of compressed video streams [...]"

Column 3, Line 47, "The first memory is accessed a copy of the decompressed video frame [...]" should read "The first memory is accessed and a copy of the decompressed video frame [...]"

Column 5, Line 24, "[...] the CPU 390 controls of the display apparatus 210." should read "[...] the CPU 390 controls the display apparatus 210."

Signed and Sealed this
Twenty-third Day of October, 2012

David J. Kappos
*Director of the United States Patent and Trademark Office*